United States Patent [19]
Kolin et al.

[11] 3,755,132
[45] Aug. 28, 1973

[54] FLUID BELT ELECTROPHORESIS APPARATUS

[75] Inventors: Alexander Kolin; Stephen Jay Luner, both of Los Angeles, Calif.

[73] Assignee: Regents of the University of California, Berkeley, Calif.

[22] Filed: Nov. 8, 1971

[21] Appl. No.: 196,283

Related U.S. Application Data

[63] Continuation of Ser. No. 50,650, June 29, 1970, abandoned.

[52] U.S. Cl. .............................. 204/299, 204/180 R
[51] Int. Cl. ............................................. B01k 5/00
[58] Field of Search ................. 204/299, 300, 180 R

[56] References Cited
UNITED STATES PATENTS

| | | | |
|---|---|---|---|
| 3,125,500 | 3/1964 | Grassman et al. | 204/299 |
| 3,287,244 | 11/1966 | Mel | 204/180 R |
| 3,412,008 | 11/1968 | Strickler | 204/301 |
| 3,450,624 | 6/1969 | Natelson | 204/299 |
| 3,451,918 | 6/1969 | Kolin | 204/299 |
| 3,458,427 | 7/1969 | Strickler | 204/299 |
| 3,479,277 | 11/1969 | Kolin et al. | 204/299 |
| 3,498,905 | 3/1970 | Strickler | 204/299 |
| 3,520,793 | 7/1970 | Kolin | 204/299 |

Primary Examiner—John A. Mack
Assistant Examiner—A. C. Prescott
Attorney—Jessup & Beecher

[57] ABSTRACT

A stabilized electrophoretic apparatus is provided for free continuous flow electrophoresis for separating fractions of a chemical or biological substance, and for the injection and measuring the mobilities thereof. The apparatus provides for the injection of the material to be processed into a fluid belt of an electrolyte buffer solution to form a streak, with the fluid belt on sheath and the streak being moved in a particular direction by the combined reaction of electric current flowing through the buffer solution and a magnetic field. An electric field is provided substantially perpendicular to the direction of movement of the fluid belt, and this field causes electrophoretic migration of the charged particle components of the streak, thereby defining them from their normal course. The apparatus is constructed to incorporate a window so that an optical path may be established through the fluid belt, so that the electrophoretic mobilities of the charged particles may be readily observed and measured. This optical path also provides for a servo control of the apparatus, as will be described.

13 Claims, 6 Drawing Figures

INVENTORS:
Alexander Kolin
Stephen J. Luner

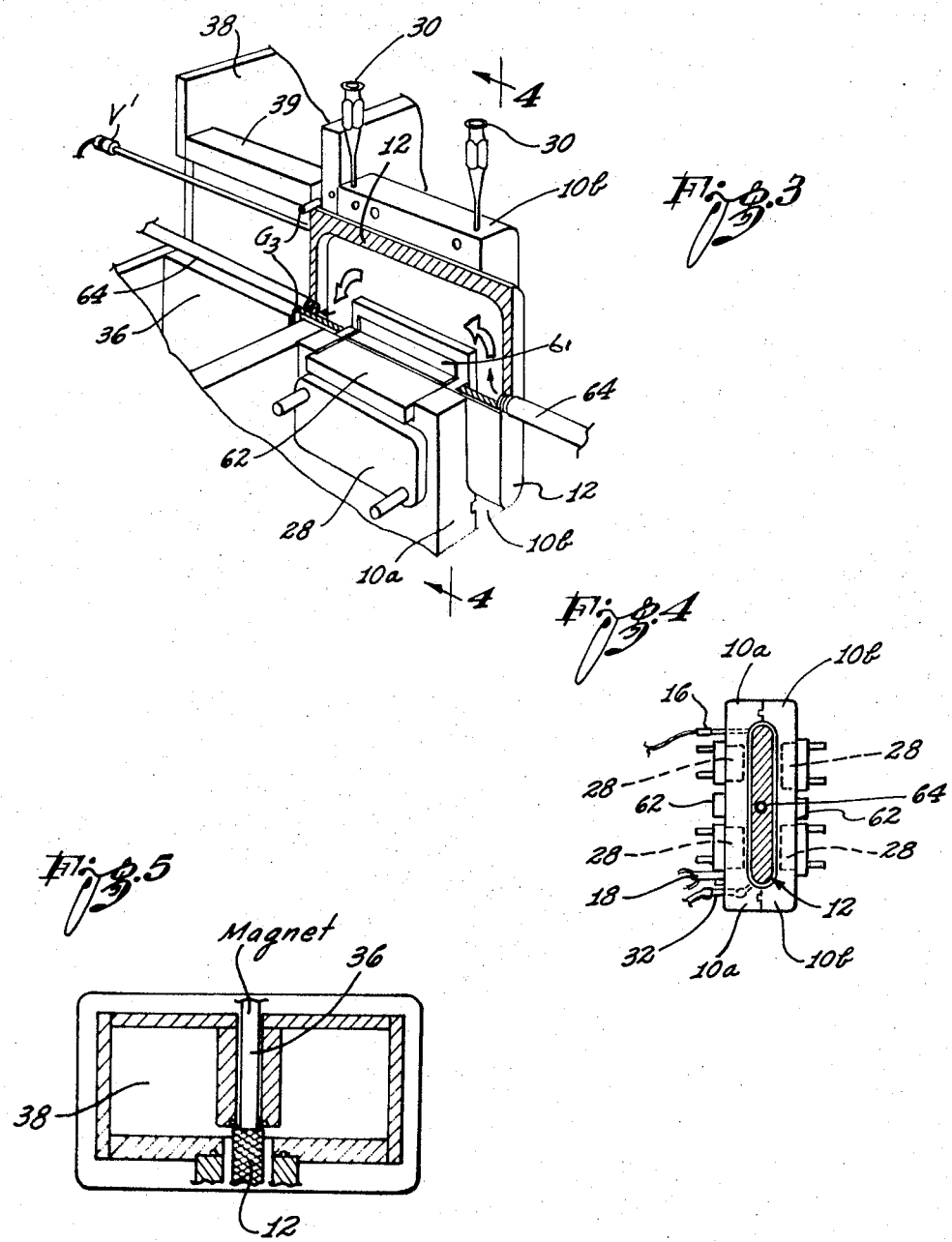

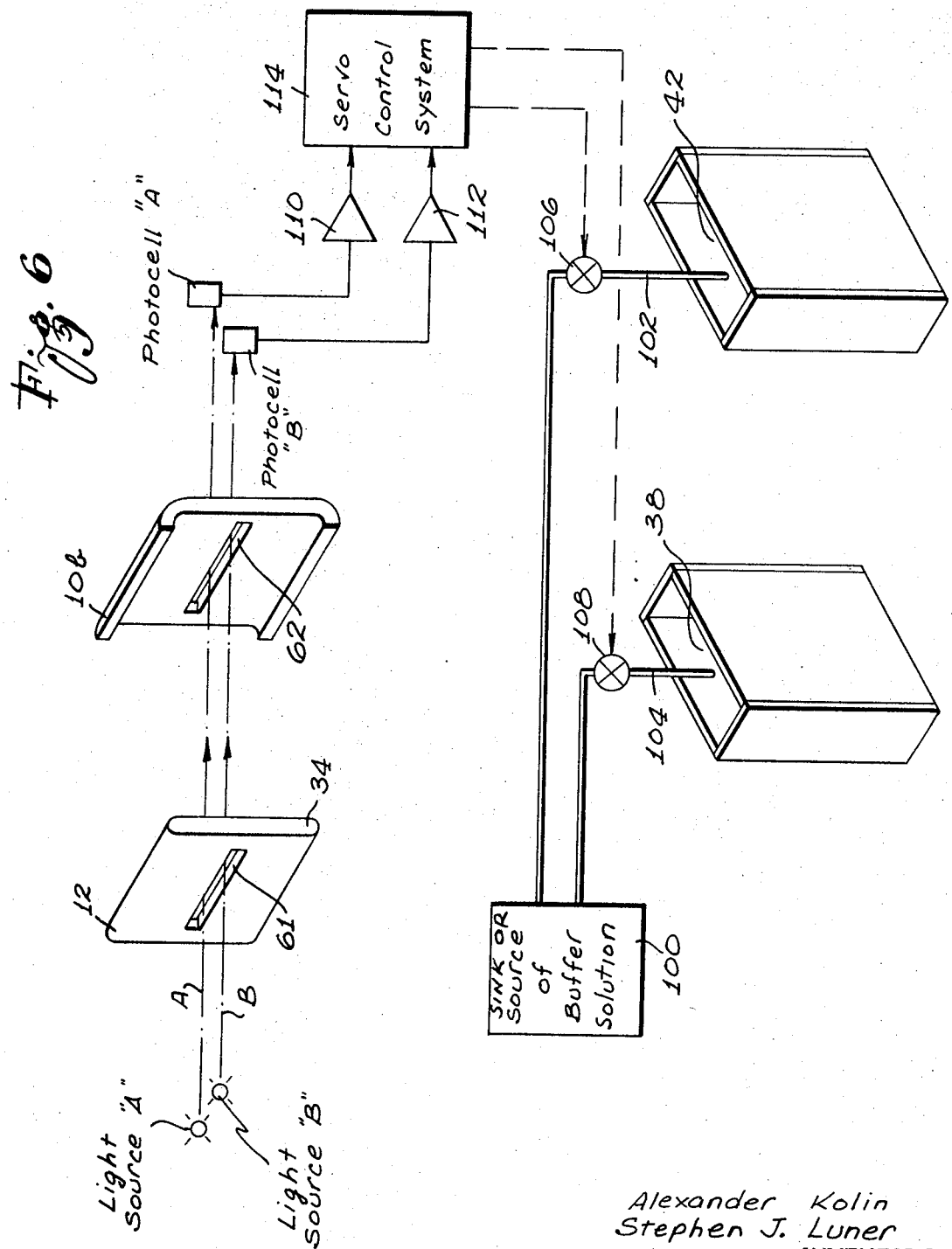

FLUID BELT ELECTROPHORESIS APPARATUS

This application is a continuation of Copending U.S. Pat. application Ser. No. 50,650 which was filed June 29, 1970 now abandoned.

BACKGROUND OF THE INVENTION

In electrophoretic separation, it is usual to introduce the substance to be separated into an electrolytic buffer solution, and to create an electric field across the solution. This field causes the charged particles of the substance to be separated to migrate in the buffer solution at rates which are determined by electrophoretic mobility of the particles and in directions determined by the charged polarities of the particles with respect to the direction of the electric field.

In the past, electrophoretic separations for the most part have been both slow, and have been capable of providing only extremely small volumes of the fractionated components of the substance being separated. In a paper entitled "Continuous Electrophoretic Fractionation Stabilized by Electromagnetic Rotation" by A. Kolin appearing in the Proceedings of the National Academy of Sciences, Volume 46, No. 4, pages 509-523, published in April 1960, a continuous method for electrophoretic separation is suggested. In that article a stabilizing means is described with respect to thermal convection which, together with sedimentation constitute two disturbing factors inherent in the electrophoresis of particles.

The apparatus of the present invention is predicated on similar operating principles to those of the system described in the aforesaid article. In the embodiment to be described, for example, an electric current is passed through the electrolytic buffer solution and a magnetic field is created, so that the buffer solution is caused to move as an endless belt around a central core. An electric field is created transverse to the direction of movement of the sheath to deflect the charged particles of substance introduced into the buffer. Windows are provided in the apparatus so that the resulting streaks may be readily observed, measured, photographed, or otherwise processed.

As will be described, the apparatus of the invention makes use of the aforesaid concepts in a fluid belt or sheet in which an electrolytic buffer fluid is provided and which may, for example, have the configuration of a vertical endless belt. Such a configuration has the advantage of allowing less time for sedimentation in the non-vertical sections at the top and bottom of the sheath. However, the sheath may be horizontal or vertical, and it may have any desired configuration. As also mentioned, it may be "kinked" for reasons to be described.

The fluid belt of electrolyte solution in the apparatus to be described, is propelled past an inlet where the substance to be studied or processed is injected into the belt in the form of a streak. Uncharged particles in the streak move in the same direction as the belt. The aforesaid electric field which is provided perpendicular, or substantially perpendicular, to the direction of movement of the sheath, causes electrophoretic migration of the charged components of the streak, thereby deflecting them from the course of uncharged components for observation and measurement of the electrophoretic mobilities. If the original streak is a mixture, for example, it may be analyzed in this way into a number of separate streaks, one for each electrophoretic mobility present. The streaks eventually flow out of the apparatus after a sufficiently long exposure to the electric field to permit a satisfactory separation or mobility measurement.

BRIEF DESCRIPTION OF THE DRAWINGS

FIG. 3 is a fragmentary perspective representation of a portion of the apparatus;

FIG. 4 is a sectional view of the apparatus of FIG. 3 taken along the line 4—4 of FIG. 3;

FIG. 5 is a sectional representation of the apparatus of FIG. 3 taken along the line 5—5 of FIG. 3; and FIG. 6 is a schematic representation of a servo control which may be instituted into the apparatus.

DETAILED DESCRIPTION OF THE ILLUSTRATED EMBODIMENT

In the apparatus to be described, an electric field is created perpendicular to, or substantially perpendicular to the motion of a fluid belt of electrolyte buffer solution, in which a streak of the substance to be processed is injected, the streak containing charged ions or charged particles. The charged particles then follow a path which is neither directly in the direction of the electric field nor in the direction of the moving belt, but in an intermediate direction which is essentially dependent upon the resultant of the two velocities imposed on the charged particles, that is the velocity imposed on the particles by the moving belt and the electrophoretic velocity imposed upon the particles by the electrostatic forces of the electric field.

It is to be understood that although the following description shall be directed to an endless belt type of electrophoresis apparatus, many of the features of the apparatus of the present invention have general utility insofar as electrophoresis systems are concerned.

Figure 1:
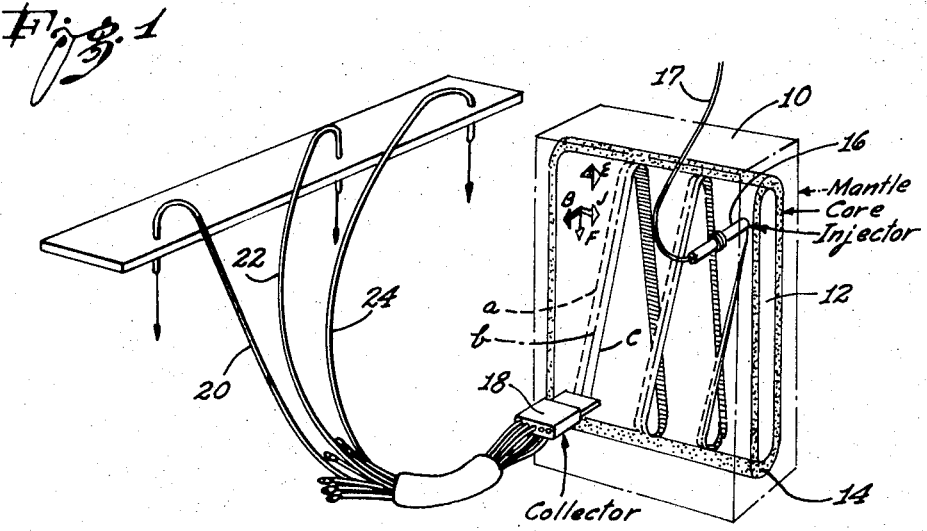
FIG. 1 is a schematic representation of the basic apparatus for carrying out the concepts of the present invention.

The apparatus of FIG. 1, for example, includes a rectangular housing or mantle 10 which may be formed, for example, of a transparent material such as Lucite. The housing 10 defines an inner vertical chamber, in the equipment disclosed in FIG. 1. A core 12 formed, for example, of iron or other suitable magnetic material is positioned within the chamber so as to define a continuous peripheral passage with the housing 10 around the chamber. An injector 16 is provided for injecting the substance to be separated into the chamber, and a collector 18 is also provided which collects the various fractions of the substance which have been separated by the electrophoresis process of the invention. These fractions are directed into separate tubes, such as the tubes 20, 22 and 24, which carry the separated fractions to appropriate receptacles.

An appropriate electrolyte buffer is introduced into the peripheral passage between the core 12 and the mantle 10. The electrolyte in the illustrated embodiment has the form of a continuous belt contained between the iron core 12 (which is insulated) and the outer mantle 10. In a constructed embodiment, for example, the "belt" of electrolyte had a width of 8 centimeters, a peripheral dimension of 21 centimeters and a thickness of 0.15 centimeters.

The flow of the electrolyte buffer solution belt around the core 12 is brought about by the same means as the rotation of an electric motor, that is, by the force exerted by a magnetic field on a current carrying element. The magnetic field may be created, for example, by positioning four bar magnets with their north poles abutting against the ends of the core 12 (not shown in FIG. 1). An electric current is passed through the buffer solution 14 so that it may be driven like the rotor of an electric motor, around the core.

The substance to be separated is introduced into the electrolyte buffer solution through the injector 16, fed through tubing 17, and it forms a streak in the moving belt of electrolytic buffer solution. The electric field causes electrophoretic migration of the charged components of the streak, thus deflecting them from their normal course. In the representation of FIG. 1, the substance to be separated is assumed to have three separate components which are separated by the electric field as they are carried by the electrolyte buffer solution around the core 12, as indicated by the three distinct lines $a$, $b$ and $c$ in FIG. 1. These lines diverge as they are carried around the core by the circulating electrolyte buffer before arriving at the collector 18. When the individual streaks arrive at the collector 18, they have had sufficiently long exposure to the electric field to permit a satisfactory separation by the collector into the separate tubular members 20, 22 and 24.

Figure 2:
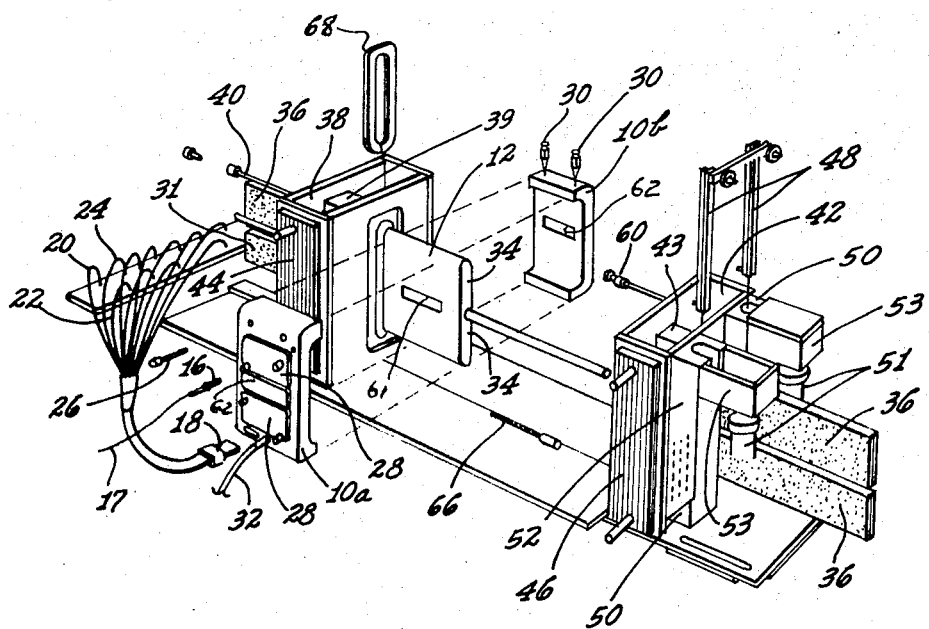
FIG. 2 is an exploded representation showing the assembly of the apparatus for practicing the invention.

The apparatus of FIG. 1 is shown in greater detail in the exploded view of FIG. 2. As shown in FIG. 2, for example, the mantle 10 is formed of two sections designated 10$a$ and 10$b$, these sections being held together, for example, by screws such as the screw 26. The front half 10$a$ of the mantle receives the injector 16 and the collector 18. Cooling fluid compartments 28 are also mounted on both halves 10$a$, and 10$b$ of the mantle, and a cooling fluid such as water is circulated through these compartments. The rear half 10$b$ of the mantle includes appropriate vents 30 which extend into the peripheral passageway between the core 12 and mantle 10, through which the continuous electrolyte buffer belt is circulated.

A further conduit for electrolyte 32 is positioned in the front half 10$a$ of the mantle, and which serves as a collector compensator. Silicon rubber pads 34, for example, may be mounted on each end of the core 12, and these pads serve as shock absorbers for front ends of bar magnets 36. As mentioned above, the bar magnets 36 have their north poles, for example, contacting the ends of the core 12 to create the desired magnetic field within the peripheral passage between the core and the mantle causing the belt of electrolyte buffer solution to turn within the passageway when electric current is passed through the electrolyte.

Compartments 38 and 42 for the buffer solution are positioned at each end of the mantle 10, with air vents being provided for the compartments. Cooling fluid compartments 44 and 46 are provided on the ends of the electrolyte buffer compartments 38 and 40 and a suitable coolant, such as water is circulated through these latter compartments.

Appropriate electrodes, such as electrodes 48, create the necessary electric current through the electrolyte buffer solution to produce the aforesaid movement of the "belt," and these electrodes also create the required electric field for electrophoretic separation. The electrodes 48 are received in the channels 50 adjacent the buffer compartments 38 and 42, and perforated diaphragms 52 are provided between the electrode compartments 50 and the buffer compartments. The illustrated electrodes 48 may serve, for example, as the cathodes, and the electrodes (not shown) at the other end of the mantle serve as the anodes, so as to create the desired electric field and the desired electric current through the circulating electrolyte buffer solution. The buffer compartments and associated components are held in assembled condition with the mantle 10 by means, for example, of compression screws such as the screws 60 and 66. Gaskets such as $G_3$ may be employed.

It will be appreciated that the electrodes, such as the cathode electrodes 48, and the anode electrodes (not shown) at the other end of the mantle 10, produce a current in the electrolyte solution from left to right, as shown by the arrow "J" in FIG. 1, when a voltage of appropriate polarity is applied across the anode and cathode electrodes. This current J interacts with the magnetic field produced by the magnets 36, and which is in the direction designated by the arrow B at right angles to the arrow J, and these fields interact in accordance with basic electric principles to produce a force F on the electrolyte buffer solution in the direction shown in FIG. 1, causing the belt of the electrolyte buffer solution to circulate around the insulated core 12 in the direction shown by the arrow F.

The particles of the substance injected into the electrolyte belt by the injector 16 form a streak a few tenths of a millimeter in diameter. These particles share the aforesaid circulating motion of the ambient fluid of the electrolyte buffer belt, and in addition, they migrate from right to left (for negatively charged particles) under the influence of the electric field established by the aforesaid electrodes and due to electrophoretic action. The superposition of the two motions on the charged particles results in the non-circular helices indicated by the lines a, b and c of FIG. 1, showing the separation of three components of different mobilities. The sense of each helix for a north magnetic core is left-handed for negative particles and right-handed for positive particles. The pitch of each helix is proportional to the electrophoretic mobility.

Increases in the electric field do not improve the separation of the various streak helices for a given number of rotations because doubling the voltage, while doubling the rate of migration, doubles also the rate of revolution of the buffer sheath, leaving the helix pitch unchanged. There is, nevertheless, an advantage in increasing the electric field since it increases the rate of circulation of the sheath which more effectively inhibits particle sedimentation.

Both the iron core 12 and the Lucite mantle 10$a$, 10$b$ may be hollowed out as shown in FIGS. 3–5 for the circulation of cooling fluid. The cooling fluid may, for example, be water passed through a packed bed of ice cubes. A space is provided in the iron core for a window 61. The window may be formed, for example, of quartz, or other suitable transparent material. Threaded holes are also provided in the core for receiving tubes 64 through which the coolant is circulated. The window, as will be described, is useful in the measurement of the different electrophoretic mobilities. As shown in FIGS. 2, 3 and 4, similar quartz windows 62 are provided in the mantle sections 10$a$ and 10$b$, in alignment with the window 61. These windows permit observation of the electrolyte belt and through the belt as it revolves around the core 12.

In a constructed embodiment of the apparatus, insulating varnish, such as Epoxylite 6001-M supplied by the Epoxylite Corporation of South El Monte, California, was used to provide an insulating coating over the core 12. This coating was made thin enough to allow good heat removal from the electrolyte belt by the cooling fluid circulated into the core as shown in FIG. 3, and yet the coating was of sufficient insulating qualities so as to withstand, for example, 1 kilo-volt. The quartz window 61 was cemented into the insulated core 12 in the constructed embodiment using, for example, General Electric RTV-112 silicone rubber cement. A vent 40 allows removal of air trapped in the core.

The front section 10a of the Lucite mantle has a circular hole formed therein to receive the injector 16, and the mantle section 10a also has a wide oblong hole therein for the collector 18. Both the aforesaid holes may be surrounded with silicone rubber O-rings for a leak-proof fit of the injector 16 and collector 18. The cooling compartments 28 are machined into the sections 10a and 10b of the mantle, so that only a thin portion of the mantle material exists between the cooling compartments 28 and the circulating buffer electrolyte belt, as best shown in FIG. 4. In this way the cooling fluid in the compartments 28 may be used efficiently to cool the electrolyte belt, in conjunction with the cooling fluid being circulated through the core, as shown in FIG. 3.

The injector 16 may consist of two parts, a main tubular body which terminates flush with the inner wall of the Lucite mantle 10a, which may have the form, for example, of a Lucite cylinder 3 millimeters in diameter. The injector may also comprise a glass capillary tube, for example, of 0.2 millimeter bore and 0.6 millimeter outer diameter which extends through the Lucite cylinder and into the interior of the electrolyte belt. The latter tube may be configured to make a 90° turn downward ending with its discharge opening centered in the annulus and pointed straight down.

The collector 18 may be in the form of a flat rectangular slab of Lucite, for example, and may be 3 millimeters thick and 19.5 millimeters wide, with rounded sides. The collector is pushed through the section 10a of the mantle until it abuts against the core 12. The collector thus intersects the circulating electrolyte buffer belt, which enters a row, for example, of rectangular channels milled into the Lucite slab of the collector at 1 millimeter intervals. These channels may terminate in the tubing, such as the tubing 20, 22 and 24 which may carry the separated fractions to test tubes, or other appropriate receptacles.

The withdrawal of fluid from the moving buffer belt by the collector 18 pulls the fluid in the belt towards it, thus distorting the flow lines from their regular helical course. To eliminate this distortion and to straighten out the lines of flow, it is desirable to introduce beneath the collector as much solution as enters from above it. Then the flow pattern will seem to go continuously through the collector as though it were not there. To accomplish this, the collector compensator 32 is inserted through the mantle section 10a directly below the collector 18.

For example, a collector compensation manifold may be machined into the mantle beneath the collector, feeding four holes spaced equally apart and leading to the buffer electrolyte belt. Together with the collector, this compensation manifold forms a source-sink dipole, the flow of which is adjusted by first lowering the outflow tubes from the collector until the out-flow velocity is the same as the belt velocity. Then the streaks which normally run approximately parallel will not start to converge or diverge notably upon approaching the collector. The in-flow through the collector compensator 32 is regulated so that the pitch of the helical streak becomes nearly uniform over its entire course. This is accomplished when the segment of streak seen through the mantle windows 62 and through the core window 61 to be rising behind the core is equally spaced between the adjacent streak segments descending in front of the core.

The reservoirs 38 and 42 attached to the opposite ends of the mantle 10 have a rectangular shape in the illustrated embodiment, and are in communication with the opposite ends of the peripheral passage around the core 12. These reservoirs serve to supply the buffer solution to the endless fluid belt within the aforesaid passage, and to establish a pressure differential across the belt for a desired amount of left to right flow of the streaks in conjunction with or in opposition to the lateral deflection of the streaks caused by the aforesaid electric field.

Tunnels, such as the tunnels 39 and 43 in FIG. 2 are provided which extend through the reservoirs 38 and 42, and which permit the insertion of the bar magnets 36 into their abutting relationship with the core 12, as described above.

The two buffer reservoirs 38 and 42 communicate electrically and hydraulically through the intervening electrolyte buffer fluid belt. To prevent thermal convection at the edges where the fluid belt and buffer reservoirs join, elongated rings of polyurethane foam, for example, as designated 68 in FIG. 2, may be inserted at the junctions of the fluid belt and the buffer reservoirs. The heat exchangers 44 and 46 in the buffer reservoirs 38 and 42 may be, for example, in the form of insulated brass heat exchanger panels built into the wall of each buffer compartment, and an appropriate coolant is circulated for cooling the buffer solution in the reservoirs.

In some prior art electrophoresis cells, the voltage is applied across the electrolyte solution by electrodes separated from the buffer reservoirs by membranes made, for example, from cellophane dialyzing tubing. To remove the products of electrode reactions in such prior art cells, fresh buffer solution must constantly be circulated through the electrode compartments in order to maintain the buffer solution in the electrode compartments at a constant composition. Such a procedure, however, does not insure that the concentration of ions in the buffer reservoirs will remain constant, as it would if ions were migrating through the buffer reservoirs, from cathode to anode and vice versa completely unaffected by the prior art membranes. To avoid drifts in ion concentration, the membranes are eliminated in the apparatus of the invention.

Instead, in order to remove the electrode reaction, the solution itself is caused to flow past the electrodes and away from the buffer reservoirs 38 and 42 with a velocity greater than the electrophoretic velocity of the ions. The membranes of the prior art are replaced in the apparatus illustrated herein by diaphragms, such as the diaphragm 52 in FIG. 2. These diaphragms, for example, may be formed of Lucite, and they may be 3 millimeters thick with holes in them so as to provide for the flow of buffer and electrical currents without allowing free convective mixing between the buffer compartments and the electrode compartments.

When buffer solution is introduced into the buffer reservoirs 38 and 42, it flows from the buffer reservoirs into the adjacent electrode compartments, such as the compartments 50, and the solution is discharged through tubes 51 (FIG. 2). To keep bubbles formed by electrolysis from blocking the tubes 51, the flow in the electrode compartment is upwards and over balconies 53 where the bubbles rise to the surface, and the buffer solution flows slowly down into the tubes 51.

The buffer solution may be conveyed to or from the reservoirs 38 and 42 as shown in FIG. 6 and through respective pipelines 102 and 104, connected to a buffer source or sink 100. The flow of the buffer solution through the pipelines may be controlled, for example, by valves 106 and 108 in the respective pipeline, or by any other suitable means. The difference in liquid level between the two buffer compartments, and hence the pressure differential across the electrolyte belt and the amount of left to right flow of the electrolyte belt may be regulated, for example, by regulating the valves 106 and 108.

It will be appreciated, therefore, that in the operation of the apparatus of the present invention, the electrolyte buffer solution is added to the cell in such a manner that the fluid flows outwards away from the center of the cell and towards the electrodes, and the fluid passes the electrodes and beyond them finally to be carried out of the cell through the tubes 51. The movement of the buffer solution towards and past the electrodes carries away the electrolysis products which are generated at the electrodes and does not permit any of such products to reach the center of the cell by electromigration. In this manner, the electrophoretic column is protected against any change in electrolytic composition. As pointed out, in the particular implementation shown in FIGS. 1–5, there is no need to separate the electrodes from the rest of the cell by membranes, as was required in the prior art apparatus.

The apparatus also has the feature of the windows 61 and 62 which extend directly through the mantle sections 10a and 10b and through the central core section 12. These windows permit, as described above, one to observe and line up the streaks as they pass down the front side of the apparatus with the moving belt of electrolyte buffer solution, and as they pass up the rear side. The windows, may be composed of glass, however, they may be composed of other material such as quartz, as described above. Quartz windows are advantageous in that they permit ultraviolet light to be used, for example, to photograph the separated streaks for analytical examination. It might be pointed out that a scanning system may be used in conjunction with the windows whereby a thin beam of visible or ultraviolet light is moved past the windows at right angles to the direction of flow of the streaks, so that the scanning operation may determine the number and position of the various electrophoretic fractions.

As shown in FIG. 2, for example, the entire apparatus is conveniently demountable for cleaning purposes. The windows themselves may be removably mounted in the mantle and in the core, for example, by appropriate gaskets. This would permit the windows themselves to be removed for cleaning purposes without the need for dismantling the entire cell. It is clear that the windows must be scrupulously clean in order to avoid light scattering if the various fractions in the individual streaks are to be observed by light scattering. With the outer window removable, for example, it is an easy matter to remove and clean them, and then to reinsert them.

It is also possible to replace the circulating belt with a moving curtain of the buffer solution, in which case there is no need for the internal core, and the whole cell may be made transparent and used to observe the streaks in the buffer solution. Moreover, the buffer solution may be caused to change its path at the point of optical observation, so that instead of looking directly through the belt or curtain, which may be so thin that difficulty is encountered in observing the streaks, the curtain may be made to travel a distance along the optical path so that the individual streaks may be more easily observed.

Instead of applying a direct current to the cell, as described above, a square-wave current, for example, at a very low frequency may be introduced. For example, the current may be allowed to flow for several minutes to the right, and then for several minutes to the left, and so on. As a result of this, the electrochemical processes in the electrode compartments, such as the compartments 50 of FIG. 2, will constantly neutralize so that there will be no rapid electrochemical deterioration and changes in the fluid, and so that one could perform many analyses within the intervals in which the current is flowing in the proper direction, and without having to change the buffer or to maintain a rapid buffer flow through the insert.

It is also possible in the apparatus described above to insert a tracer dye into the circulating belt of buffer solution, and which may or may not migrate electrophoretically. Then, the tracer dye may be used to create a streak in the curtain of buffer solution which serves to intercept one or more light beams, such as light beams A and B in FIG. 6 from respective light sources "A" and "B," and which pass thorugh the windows 61 and 62, as shown. The light beams are detected by corresponding photocells designated photocell "A" and photocell "B," and the resulting electric currents are amplified by amplifiers 110 and 112, and the amplified signals are applied to an appropriate servo control system 114.

As the streaks in the curtain of buffer solution intercept the respective light beams A and B, the servo control system 114 responds to the resulting signals from the amplifiers 110 and 112 to control the valves 106 and 108. The control is such as to regulate the rate of introduction or removal of buffer solution in the reservoirs 38 and 42, and thereby to control the amount of right to left movement of the buffer solution in the belt so as to keep the tracer dye streak in a predetermined relation to the photocells in order to insure stable collection of separated fractions.

It is evident that although particular embodiments of the invention have been shown, described and suggested, other modifications may be made. It is intended in the following claims to cover all modifications which come within the scope of the invention.

What is claimed is:

1. Electrophoretic apparatus comprising:

a vessel containing an electrolyte solution in a prescribed configuration;

means for introducing a solution or suspension of particles into said electrolyte solution;

means for moving said electrolyte solution relative to the point of introduction of said solution or particle suspension generating a streak-like path of said introduced solution or suspension;

electrode means for producing an electric field substantially transverse to said streak-like path causing electrophoretic migration of said introduced material in the direction of said electric field, said streak-like path being deflected transversely to the direction of movement of said electrolyte solution by said electric field;

said electrode means being located in electrolyte solution continuous with and in electric and hydraulic contact unobstructed by intervening membranes with the electrolyte solution in the region of the streak-like path;

means for inducing a flow of said electrolyte solution past said electrode means in a direction away from the region of the streak-like paths to carry away electrolysis products generated by said electrode means.

2. The apparatus defined in claim 1, and which includes window means for providing an optical path through said electrolyte solution.

3. The apparatus defined in claim 7, and which includes window means disposed in said mantle and in said core to provide an optical path through the endless belt of electrolyte solution.

4. The apparatus defined in claim 2, in which said window means in said mantle are removable.

5. The apparatus as defined in claim 2, in which said window means are composed of a material to permit the passage of ultraviolet light therethrough.

6. The apparatus defined in claim 1 in which said prescribed configuration is an endless belt-like configuration.

7. The apparatus defined in claim 1, and which includes a ferro magnetic core, and a mantle surrounding said core and causing said electrolyte solution to flow as an endless belt around said core.

8. The apparatus defined in claim 7, and which includes magnetic means associated with said core for creating a magnetic field in a direction to cause the buffer solution to flow around said core.

9. The apparatus defined in claim 1 in which said last-named means includes first and second reservoirs for the electrolyte solution on opposite sides of the path of the moving electrolyte solution containing streaks of introduced material, and means for introducing electrolyte solution into and removing electrolyte solution from said reservoirs so as to control the component of flow of said moving electrolyte solution along the direction of the electric field.

10. The apparatus defined in claim 9, and which includes a servo-control system for controlling the flow into or out from said reservoirs so as to control the component of flow of said electrolyte solution along the direction of said electric field so as to insure at all times the passage of at least one streak through a predetermined point remote from the point of introduction of said particles.

11. The apparatus defined in claim 10, and which includes:

means for directing at least one light beam along an optical path through said electrolyte to be selectively intercepted by a streak in said electrolyte solution, and photo cell means responsive to said light beam and to the interception thereof for controlling said servo-control system.

12. The apparatus defined in claim 1, in which said electrode means produces an electric field which is periodically reversed.

13. The apparatus defined in claim 1 wherein said vessel includes:

an encompassing mantle and an interiorly located core forming an endless belt of electrolyte solution in which said moving of said electrolyte solution is effected.

* * * * *